US006365678B1

(12) United States Patent
Reuter et al.

(10) Patent No.: US 6,365,678 B1
(45) Date of Patent: Apr. 2, 2002

(54) PROCESS FOR THE PRODUCTION OF POLYETHER BLOCK COPOLYSULFONES

(75) Inventors: Knud Reuter; Claus-Ludolf Schultz; Ute Wollborn; Heinz Pudleiner, all of Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/501,909

(22) Filed: Feb. 10, 2000

(30) Foreign Application Priority Data

Feb. 23, 1999 (DE) .......................... 199 07 605

(51) Int. Cl.⁷ .................. C08G 81/00; C08G 75/23
(52) U.S. Cl. .................. 525/409; 525/534; 525/535; 528/171; 528/174; 528/391
(58) Field of Search ................ 525/409, 535, 525/534; 528/171, 174, 391

(56) References Cited

U.S. PATENT DOCUMENTS 4,010,147 A   3/1977  Rose ................ 260/79.3 M
5,700,902 A  12/1997  Hancock et al. ............ 528/373
5,798,437 A   8/1998  Hancock et al. ............ 528/373
5,834,583 A  11/1998  Hancock et al. ............ 528/499
5,861,471 A   1/1999  Pudleiner et al. .......... 528/126
5,911,880 A * 6/1999  Klein
5,969,082 A  10/1999  Kuwahara et al. .......... 528/171

FOREIGN PATENT DOCUMENTS

EP          092 726       11/1983

* cited by examiner

*Primary Examiner*—David J. Buttner
(74) *Attorney, Agent, or Firm*—Joseph C. Gil; Aron Preis

(57) ABSTRACT

A process for the production of polyether block copolysulfones via trans-etherification is disclosed. In the inventive process, an aromatic sulfone polymer is reacted with an aliphatic polyether having on average at least one terminal OH function, preferably in the presence of a basic catalyst. In a preferred embodiment the reaction is carried out in a dipolar aprotic solvent.

15 Claims, No Drawings

PROCESS FOR THE PRODUCTION OF POLYETHER BLOCK COPOLYSULFONES

Polyether block copolysulfones (referred to below as PEBSUs) of different structures and produced by different processes are known (e.g., EP-A 739,925, EP-A 781,795, U.S. Pat. No. 5,700,902, U.S. Pat. No. 5,798,437, U.S. Pat. No. 5,834,583 and Macromolecules 1996, 29 (23) 7619–7621). They are valuable materials, e.g., for biomedical applications with great potential for use in dialysis membranes, catheters or blood tubes, etc.

The processes described in the above-mentioned prior art build up the polyether block copolysulfones from the monomer units.

The processes of the prior art have the disadvantage that they can only be implemented economically with the special equipment tailored to polysulfone production and in the large tonnages conventional for industrial thermoplastics (about 1000 tonnes per annum). The special applications of PEBSUs in the field of medical technology, however, mean that it has to be possible to produce economically a range of smaller products in different grades. Thus, there is a technical need for a process for the production of PEBSUs which is economical even in small quantities, is highly variable referring to the composition of educts and at the same time very simple. This process should furthermore be undemanding in terms of equipment, in order to create the preconditions for economic production for products with applications in the medical field.

Surprisingly, it has been found that PEBSUs can be produced from unmodified sulfone polymers by subsequent reaction (transetherification) with hydroxyfunctional polyethers. The term "sulfone polymers" here denotes all aromatic sulfone polymers including the group of the actual polysulfones (PSU), polyether sulfones (PES) and polyaryl ether sulfones (PAES).

The present invention therefore provides a process for the production of polyether block copolysulfones, characterized in that an aromatic sulfone polymer (A) is reacted with an aliphatic polyether with at least one, preferably at least two, terminal OH functions (B).

A process in which the components (A) and (B) are reacted in the presence of a basic catalyst (C) is preferred.

The reaction is preferably carried out in a dipolar aprotic solvent (D).

Preferred sulfone polymers (A) are aromatic sulfone polymers with the repeating unit (I)

$$—E—Ar^1—SO_2—Ar^2—$$ (I)

wherein

E is a divalent diphenolate radical and $Ar^1$ and $Ar^2$ signify the same or different difunctional aromatic radicals with 6 to 50, preferably 6 to 25, carbon atoms, $Ar^1$ and $Ar^2$ preferably denote, independently of one another, an aromatic radical with 6 to 10 carbon atoms, optionally mono- or polysubstituted by $C_1$–$C_{12}$ alkyl, and E preferably denotes a radical of the formula (II)

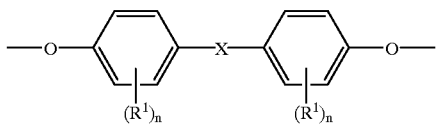

(II)

wherein $R^1$ each independently of the other, being the same or different, denotes hydrogen, halogen, $C_1$–$C_6$ alkyl or $C_1$–$C_6$ alkoxy, preferably hydrogen, fluorine, chlorine, bromine, n denotes an integer from 1 to 4, preferably 1, 2 or 3, especially 1 or 2, X denotes a chemical bond, —CO—, —O—, —S—, —SO$_2$—, alkylene, preferably $C_1$–$C_8$ alkylene, alkylidene, preferably $C_2$–$C_{10}$ alkylidene, or cycloalkylene, the last 3 radicals mentioned optionally being substituted by substituents selected from halogen, especially fluorine, chlorine, bromine, optionally by fluorine-, chlorine-, bromine-, $C_1$–$C_4$ alkyl- and/or $C_1$–$C_4$ alkoxy-substituted phenyl or naphthyl, and cycloalkylene optionally also being substituted by $C_1$–$C_6$ alkyl.

Where X denotes cycloalkylene, X preferably denotes a radical of the formula (III)

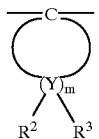

(III)

wherein

Y denotes carbon, $R^2$ and $R^3$, selectable individually for each Y, independently of one another denote hydrogen or $C_1$–$C_6$ alkyl, particularly preferably hydrogen or $C_1$–$C_4$ alkyl, especially hydrogen, methyl or ethyl and m denotes an integer from 3 to 12, preferably 4 to 8, especially 4 or 5.

$Ar^1$ and $Ar^2$ especially denote, independently of one another, phenyl or naphthyl optionally substituted by $C_1$–$C_4$ alkyl, e.g., methyl.

Particularly preferred sulfone polymers are, e.g., the polysulfone of bisphenol A (commercially available with the name of Udel™ from Amoco, Chicago, USA or Ultrason® S from BASF), a polyether sulfone with the idealized structure —(O—$C_6H_4$—$SO_2$—$C_6H_4$—)$_x$ (commercially available, e.g., with the name of Ultrason E from BASF and SumikaExcel from Sumitomo, Japan), the polyaryl ether sulfone with 4,4'-dihydroxydiphenyl structures from Amoco (Radel R), or polysulfones with TMC-bisphenol structures according to DE-OS 3.833.385. All the above types of sulfone polymer can optionally be used in different grades, as regards molecular weight. The choice will be determined by the desired molecular weights of the end products. In general, the sulfone polymers have average molecular weights (weight average) of 5000 to 100,000, preferably 5000 to 75,000, measured by gel permeation chromatography (GPC) against a polystyrene standard.

The polysulfone of bisphenol A is mostly preferred.

Aliphatic polyethers (B) to be used according to the invention are hydroxyl group-containing polyethers with at least one, especially two to eight hydroxyl groups and a molecular weight (number average) of 400 to 25,000, calculated from the hydroxyl number in conjunction with the functionality. Such polyethers with at least one, preferably two to three, particularly preferably two hydroxyl groups are known and are produced e.g., by polymerization of ethylene oxide, propylene oxide, butylene oxide, tetrahydrofuran or styrene oxide with themselves, e.g., in the presence of Lewis catalysts such as $BF_3$, or by addition of these epoxides, preferably of ethylene oxide and propylene oxide, optionally mixed together or consecutively, to initiator components with reactive hydrogen atoms such as water, alcohols, ammonia or amines, e.g., ethylene glycol, 1,3- or 1,2-propylene glycol, trimethylolpropane, glycerol, sorbitol, 4,4'-dihydroxy-diphenylpropane, aniline, ethanolamine or ethylenediamine. Sucrose polyethers (e.g., DE-AS 1,176,358 and 1,064,938) and polyethers initiated on formitol or formose (DE-OS 2,639,983 and 2,737,951, respectively) are also suitable according to the invention.

Those polyethers having predominantly (based on all OH groups) in the polyether primary OH groups are preferred. Preferably the polyethers have at least 90 wt. % primary OH groups. Particularly preferred are polyethers having 100 wt. % or nearly 100 wt. % of primary OH groups.

Component B) also comprises polythioethers, especially the condensation products of thiodiglycol with itself and/or with other glycols or formaldehyde.

In addition, polyacetals, e.g., the compounds that can be produced from glycols such as diethylene glycol, triethylene glycol, 4,4'-dioxethoxy-diphenyldimethylmethane, hexanediol and formaldehyde are suitable. Compounds (B) which can be used according to the invention can also be produced by polymerizing cyclic acetals such as, e.g., trioxane (DE-Offenlegungsschrift 1 694 128).

Preferred aliphatic polyethers (B) are polyethers of the general structural formula

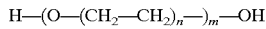

with n=1 or 2 and m=natural number from 1 to 500.

Particularly preferred aliphatic polyethers are, e.g., polyethylene glycol with molecular weights of 400 to 20,000 (number average) and an OH functionality of about 2 or polytetrahydrofuran with a molecular weight of approx. 500 to 10,000 and an OH functionality of about 2.

Mixtures of two or more different polyethers can also be used, "different" relating both to the chemical structure and to the molecular weight of the polyether.

The polyether block copolysulfones generally have molecular weights of between 5000 and 100,000, preferably between 10,000 and 75,000, weight average, measured by GPC against a polystyrene standard.

Basic catalysts (C) which are suitable in principle are, e.g., carbonates such as lithium carbonate, sodium carbonate, sodium hydrogencarbonate, potassium carbonate, potassium hydrogencarbonate, caesium carbonate, magnesium carbonate, calcium carbonate. Potassium carbonate is particularly preferably used. The quantities of the basic catalyst are substantially dependent on the quantity of polyether to be reacted. In the case of carbonate catalysts, an excess of catalyst based on the quantity of OH groups present in the reaction mixture is preferably used. Other basic salts are also suitable as catalyst; sodium phosphate and especially potassium phosphate, but also dipotassium monohydrogenphosphate can be mentioned as examples. Amines are also suitable as catalysts in principle, provided sufficient basicity is present, such as e.g., diazabicyclooctane (DABCO). Metal hydroxides, particularly alkali metal hydroxides such as lithium hydroxide, sodium hydroxide and potassium hydroxide are also suitable as catalysts for the process according to the invention. These catalysts are preferably used in stoichiometric quantities, based on the number of hydroxyl groups present in the reaction mixture.

Preferred dipolar aprotic solvents (D) are dimethyl sulfoxide, sulfolane, N-methyl-pyrrolidone, N-methylcaprolactam, N,N-dimethylformamide, N,N-dimethylacetamide. Dimethyl sulfoxide is particularly preferred.

Two or more dipolar aprotic solvents can optionally also be used in a mixture.

Mixtures of dipolar aprotic solvent with non-polar, aliphatic, cycloaliphatic or prefera-bly aromatic solvents, e.g., toluene, xylene(s), chlorobenzene or o-dichlorobenzene can also be used. The proportion by volume of dipolar aprotic solvent should be no less than 50% in this case.

The reaction is performed at elevated temperature, preferably at 60 to 230° C., particularly preferably at 130 to 200° C. The choice of reaction temperature should be adapted to the solvent (or solvent mixture) used, e.g., in dimethyl sulfoxide (DMSO) or mixtures with DMSO (e.g., DMSO/toluene), a temperature range of 130 to 160° C. is preferred, whereas in N-methylpyrrolidone (NMP) or mixtures with NMP the reaction is preferably performed at 170 to 200° C.

In principle, it is also possible to react the sulfone polymers (A) and aliphatic polyethers (B) under base catalysis by means of (C) without a solvent. In this case, the temperature must be increased to 200 to 400° C., preferably 230 to 350° C. Adequate intermixture of the polymer melt then has to be ensured, e.g., by performing the reaction in an extruder.

The polymer can be worked up and isolated by the method known from polysulfone chemistry (e.g., in accordance with U.S. Pat. No. 4,108,837 or DE-OS 3.833.385), or as in the processes described in the above-mentioned patent specifications which relate to polyether block copolysulfones (e.g., EP-A 739,925). However, the work-up is not a characterizing part of the process according to the invention and numerous suitable methods are available to the expert familiar with polymer chemistry, especially polysulfone chemistry.

The by product formed in small quantities as a result of the transetherification reaction (bisphenol HO—E—OH or its dianion $^{\ominus}$O—E—O$^{\ominus}$, respectively) is removed during working-up by washing.

The quantities of dihydroxyfunctional polyether to be incorporated can be varied within a very broad range, e.g. between 0.1 and 90, preferably between 1 and 60, especially preferably between 5 and 50 wt. % polyether, based on the total weight of the segmented polycondensate. According to the quantity of polyether incorporated, products with different potential applications are obtained. In the field of medical technology, for example, with low PEO (Polyethyleneoxide) quantities of up to approx. 25 wt. %, relatively rigid materials are obtained which are suitable e.g. for housings or for films and membranes, especially dialysis membranes. With approx. 25 to approx. 50 wt. % polyether in the PEBSU, flexible materials are generally obtained with elongations at break of over 100%, which are suitable e.g. for catheters, blood tubes, etc.

EXAMPLES

Example 1

58.5 g of a commercially available polysulfone based on bisphenol A (Ultrason® S from BASF AG, Ludwigshafen, Germany), 6.5 g of a commercially available poly-ethylene glycol (Breox 8000 from BP Chemicals, Sunbury-on-Thames, UK), 200 ml DMSO, 65 ml toluene and 5.6 g potassium carbonate (99%) are heated for 9 h under reflux at 144–147° C. To isolate the product, the solution is cooled to room temperature and 100 g isopropanol is added, stirring well, followed by 200 g n-hexane. The precipitated polymer is washed with water twice and dried at 70° C. in a water jet vacuum.

The polyether block copolysulfone obtained has a relative solution viscosity $\eta_{rel}$ of 1.20 (0.5% in methylene chloride at 20° C.) and, after extraction with methanol using Soxhlet apparatus (6 h), a polyethylene glycol content of 3.6 wt. % ($^1$H-NMR).

Investigation of the PEBSU by gel permeation chromatography gives a molecular weight (weight average, polystyrene standard) of approx. 37,000 daltons. The $^1$H-NMR investigation of individual fractions of the eluate of this GPC investigation provides evidence of the chemical incorporation of the polyethylene glycol segments. No free polyethylene glycol is detectable by GPC.

Example 2

40 g of a polysulfone produced in accordance with U.S. Pat. No. 4,108,837 (Union Carbide) from 4,4'-dichlorodiphenyl sulfone and bisphenol A with a relative solution viscosity $\eta_{rel}$ of 1.515, 4.44 g (Breox 8000), 127 ml DMSO, 50 ml toluene and 19.0 g potassium carbonate (99%) are heated for 10 h under reflux at 147–149° C. The reaction mixture is worked up in accordance with example 1.

According to $^1$H-NMR, 8.5 wt. % polyethylene glycol segments are contained in the polyether block copolysulfone formed ($\eta_{rel}$=1.36).

Example 3

17.5 g of a polysulfone based on 1,1-bis(4-hydroxyphenyl)-3,3,5-trimethylcyclohexane (TMC bisphenol) in accordance with DE-OS 3,833,385 with a relative viscosity $\eta_{rel}$ of 1.267, 4.4 g (Breox 8000), 40 ml DMSO, 30 ml toluene and 7.0 g potassium carbonate are heated for 6 h under reflux at 140–147° C. The reaction mixture is worked up in accordance with example 1.

According to $^1$H-NMR, 12.9 wt. % polyethylene glycol segments are contained in the polyether block copolysulfone formed ($\eta_{rel}$=1.21).

Example 4

17.5 g of a polysulfone based on TMC bisphenol in accordance with DE-OS 3,833,385 with a relative viscosity $\eta_{rel}$ of 1.267, 1.94 g (Breox 8000), 40 ml DMSO, 30 ml toluene and 7.0 g potassium carbonate are heated for 6 h under reflux at 147–155° C. The reaction mixture is worked up in accordance with example 1.

According to $^1$H-NMR, 7.94 wt. % polyethylene glycol segments are contained in the polyether block copolysulfone formed ($\eta_{rel}$=1.22).

Example 5

22.1 g of a polysulfone produced in accordance with U.S. Pat. No. 4,108,837 (Union Carbide) from 4,4'-dichlorodiphenyl sulfone and bisphenol A with a relative solution viscosity $\eta_{rel}$ of 1.558, 2.46 g polytetrahydrofuran (Terathane 2000, Du Pont, Wilmington, USA), 65 ml DMSO, 35 ml toluene and 10.5 g potassium carbonate (99%) are heated for 4 h under reflux at 150° C.

According to $^1$H-NMR, 7.1 wt. % polytetrahydrofuran segments are contained in the polyether block copolysulfone formed ($\eta_{rel}$=1.25).

Example 6

22.1 g of a polysulfone produced in accordance with U.S. Pat. No. 4,108,837 (Union Carbide) from 4,4'-dichlorodiphenyl sulfone and bisphenol A with a relative solution viscosity $\eta_{rel}$ of 1.479, 2.46 g (Breox 8000), 65 ml DMSO, 35 ml toluene and 1.75 g potassium carbonate (99%) are heated for 6.5 h under reflux at 153° C. The reaction mixture is worked up in accordance with example 1.

According to $^1$H-NMR, 9.4 wt. % polyethylene glycol segments are contained in the polyether block copolysulfone formed ($\eta_{rel}$=1.396).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyether block copolysulfones, comprising reacting by transetherification
   (A) at least one aromatic sulfone polymer, with
   (B) at least one aliphatic polyether, said polyether having on average at least one terminal OH function.

2. The process of claim 1 wherein (B) is an aliphatic polyether having on average at least two terminal OH functions.

3. The process of claim 1 carried out in the presence of a basic catalyst.

4. The process of claim 1 wherein reaction is performed in a dipolar aprotic solvent.

5. The process of claim 1 wherein aromatic sulfone polymer conforms to

—E—Ar$^1$—SO$_2$—Ar$^2$— wherein
   E is a divalent diphenolate radical and
   Ar$^1$ and Ar$^2$ independently signify a difunctional aromatic radical having 6 to 50 carbon atoms.

6. The process of claim 5 wherein difunctional aromatic radical contains at least one substituent.

7. The process of claim 5 wherein Ar$^1$ and Ar$^2$ denote, independently of one another, an aromatic radical with 6 to 10 carbon atoms, and
   E denotes a radical of the formula (II)

(II)

wherein
   R$^1$ each independently of the other denotes hydrogen, halogen, C$_1$–C$_6$ alkyl or C$_1$–C$_6$ alkoxy,
   n denotes an integer from 1 to 4,
   X denotes a chemical bond, —CO—, —O—, —S—, —SO$_2$—, alkylene, alkylidene, or cycloalkylene wherein alkylene, alkylidene and cycloalkylene may be substituted by $C_1$–$C_6$-alkyl.

8. The process of claim 7 wherein said aromatic radical having 6 to 10 carbon atoms is substituted by at least one member selected from the group consisting of $C_1$–$C_6$ alkyl and $C_1$–$C_6$ alkoxy groups.

9. The process of claim 7 wherein X denotes a cycloalkyl radical of the formula (III),

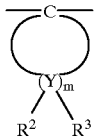

(III)

wherein
Y denotes carbon,
$R^2$ and $R^3$, individually for each Y, and independently of one another, denote hydrogen or $C_1$–$C_6$ alkyl and
m denotes an integer from 3 to 12.

10. The process of claim 7 wherein E denotes a radical of the formula (IV),

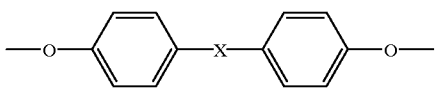

(IV)

wherein
X denotes a chemical bond, $C_1$–$C_8$ alkylene, $C_2$–$C_{10}$ alkylidene or cycloalkylene.

11. The process of claim 10 wherein cycloalkylene is substituted by $C_1$–$C_6$ alkyl.

12. The process of claim 10 wherein X denotes a radical of the formula (III)

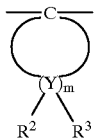

(III)

wherein
Y denotes carbon,
$R^2$ and $R^3$, individually for each Y and independently of one another, denote hydrogen or $C_1$–$C_6$ alkyl and
m denotes an integer from 3 to 12.

13. The process of claim 1 wherein aliphatic polyether conforms to

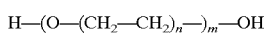

wherein n=1 or 2 and m=is an integer of up to 500.

14. The process of claim 3 wherein catalyst is a member selected from the group consisting of lithium carbonate, sodium carbonate and potassium carbonate.

15. The process of claim 4 wherein dipolar aprotic solvent is selected from the group consisting of dimethyl sulfoxide, sulfolane, N-methylpyrrolidone, N-methylcaprolactam, and N,N-dimethylacetamide or mixtures thereof.

* * * * *